(12) United States Patent
Huang

(10) Patent No.: US 6,497,777 B1
(45) Date of Patent: Dec. 24, 2002

(54) WINDOW FILM APPLICATION PROCESS

(75) Inventor: Haibin Huang, Tampa, FL (US)

(73) Assignee: Film Technologies International Inc., St. Petersburg, FL (US)

( * ) Notice: Subject to any disclaimer, the term of this patent is extended or adjusted under 35 U.S.C. 154(b) by 54 days.

(21) Appl. No.: 09/618,445

(22) Filed: Jul. 18, 2000

Related U.S. Application Data

(63) Continuation-in-part of application No. 09/235,170, filed on Jan. 22, 1999.

(51) Int. Cl.$^7$ ................ B32B 17/00; B32B 31/00; C03C 27/00
(52) U.S. Cl. ............. 156/106; 156/289; 156/314; 106/287.3
(58) Field of Search .................... 156/100, 102, 156/106, 289, 314; 106/287.23, 287.28

(56) References Cited

FOREIGN PATENT DOCUMENTS

JP          58101177 A  *  6/1983  ............. C09J/7/02

* cited by examiner

Primary Examiner—Michael W. Ball
Assistant Examiner—John L. Goff
(74) Attorney, Agent, or Firm—Donald R Bahr

(57) ABSTRACT

This invention relates to window films and more particularly to a process for installing window films in such a manner that haze is eliminated and the bond strength between the film and a substrate is enhanced. The window film application process of this invention is concerned with the application of a mounting solution to the window prior to applying the film to the window. The solutions used in this invention are solutions of metal salts of polymeric low molecular weight organic acids. Solutions of the sodium salt of polyacrylic acids are preferred for use in this invention. The concentrations of the low molecular weight organic acid can be from about 1 to about 33 weight percent.

20 Claims, 2 Drawing Sheets

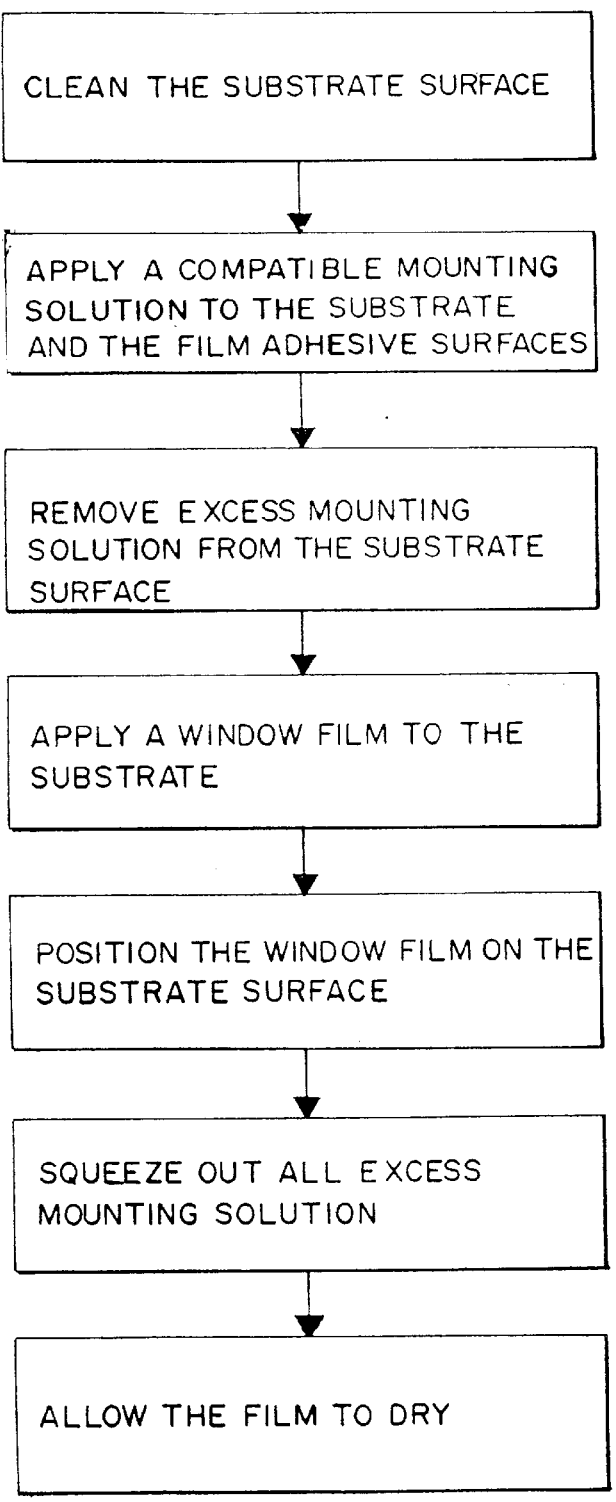
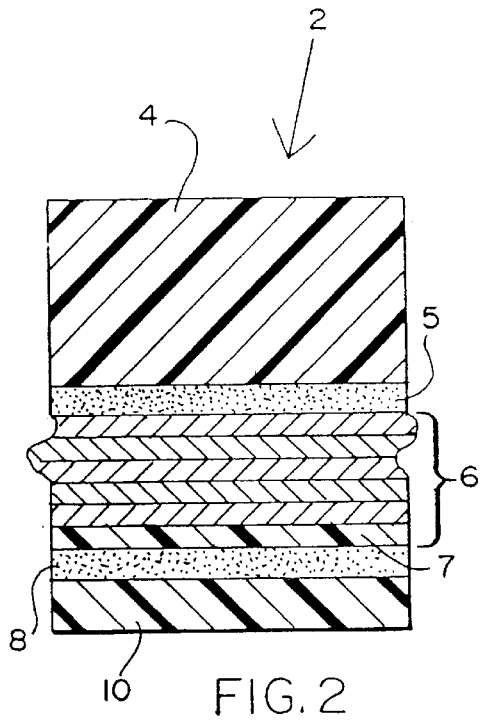
FIG. 2
FIG. 1

WINDOW FILM APPLICATION PROCESS

RELATED APPLICATIONS

This application is a continuation in part of application Ser. No. 09/235,170 filed Jan. 22, 1999.

FIELD OF THE INVENTION

This invention is concerned with film technology and more particularly with window films. In accordance with this invention, the optical properties of a window film when applied to a substrate are enhanced by use of an application process and solution wherein haze between the window film and the window is eliminated. As a result of this enhancement a film may be retrofitted to a substrate in such a manner that a degree of clarity is obtained which is not possible using prior art application process.

BACKGROUND OF THE INVENTION

The application or retrofitting of films to windows and other substrates for various purposes is quite common. In the most common applications, films are applied to windows, for example, polymeric or glass panes. Films can also be applied to window panes to affect the ability of these panes to absorb or transmit heat or ultraviolet (UV) light. Further, films can be applied in order to change the color of a window pane. Likewise, films can be applied in order to increase the strength of a window pane and in particular, the ability of the window pane to stay intact after an impact by a foreign object. Films are also applied to window panes in order to alter the ability of the window pane to transmit, absorb or reflect visible and invisible solar radiation. In all applications of films, it is desirable that there be no haze between the film and the substrate. This invention is concerned with a process whereby a window film may be applied in such a manner that there is no haze at the interface between the window and window film. Further this invention is concerned with the interaction of a mounting solution with the pressure sensitive adhesive which is an integral part of the film. More particularly, this invention is concerned with window film mounting solutions which will not react with the pressure sensitive adhesive in such a manner as to create a haze. In the prior art, haze is quite common. This haze results from the fact that certain components of the mounting solution are not compatible with the pressure sensitive adhesive which is used in the application of the film to a substrate.

In the preferred embodiment, a window film is retrofitted to a substrate via the following procedure.

1. Clean the substrate surface with water, soap, or organic solvent;
2. Spray a mounting solution on to the substrate surface and pressure sensitive adhesive surface of the window film;
3. Remove excess mounting solution;
4. Apply the window film to the substrate such that the pressure sensitive adhesive surface faces the substrate,
5. Properly position the window film on the substrate surface,
6. Squeeze out all excess mounting solution;
7. Allow the film to dry;

It is points 2 and 7 as set forth above that this invention is concerned with. Prior art mounting solutions comprise water which incorporates a wetting agent. While the applicant is not sure, he is of the opinion that a haze development during step 7 above is the result of the wetting agent in the mounting solution being incompatible with the pressure sensitive adhesive in such a manner that a two phased interface results. To an observer this two phase system appears as a haze because of light scattering. With this invention, it is possible to eliminate the alteration of the pressure sensitive adhesive in such a manner that the pressure sensitive adhesive remains as a single phase and hence films as applied in accordance with this invention are haze free. A haze results in the prior art as a result of local fluctuations in the refractive index at the interface of the various phases present. In its broadest terms, this invention relates to the utilization of mounting solutions which will not react with the pressure sensitive adhesive which is used to mount films to a substrate.

DESCRIPTION OF THE DRAWINGS

FIG. 1 is a block diagram illustrating the process of this invention.

FIG. 2 is a cross section and view of the window film used in the examples.

BRIEF DESCRIPTION OF THE INVENTION

Figure 3:
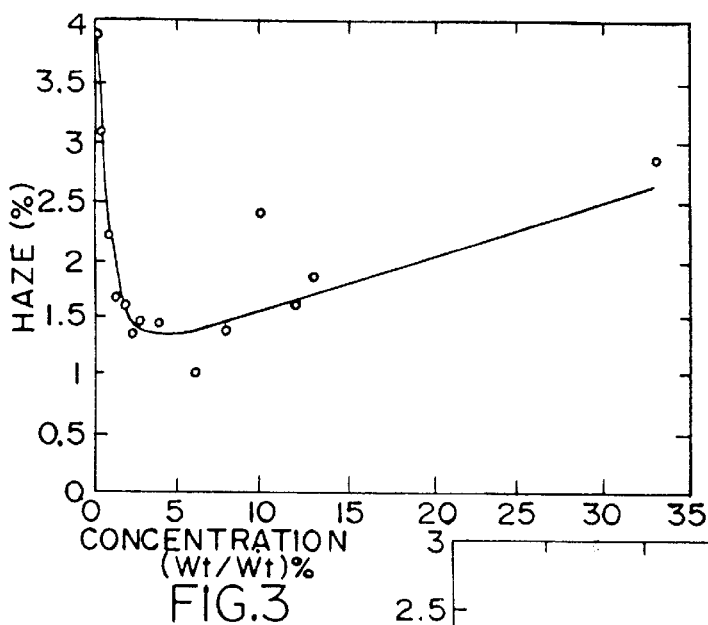
FIG. 3 is a graph showing the relationship between the concentration of polyacrylic acid sodium salt solution and haze level after 7 days.

Window films are widely retrofitted for a variety of purposes. The use of window films for the purposes as described above is well known in the prior art. Regardless of the widespread retrofitting of window films, the problem of haze at the interface of the window film and substrate is common and troublesome. The troublesome haze results from the incompatibility of prior art mounting solutions with the pressure sensitive adhesive which is used to mount the window film to the substrate. The mounting solution and related process of this invention are compatible with the pressure sensitive adhesive. Accordingly, in the drying process after the window film is applied to a substrate, the pressure sensitive adhesive retains its optical clarity.

The subject invention is concerned with a means whereby undesirable haze in a film application can be eliminated by use of a film mounting solution which incorporates a water soluble low molecular weight polyorganic acid salt.

In the preferred embodiment, the mounting solution for use in this invention incorporates a salt of a polyacrylic acid and copolymers thereof such as a polyacrylic acid which has been copolymerized with acrylamide, methacrylic acid, ethylene oxide, methyl vinyl ether, vinyl alcohol, vinyl pyrrolidone, vinyl pyridine, hydroxy methyl acrylamid, hydroxy ethyl methacrylate, styrenesulfonic acid and their salts. The problem of haze at the interface between the window film and the substrate is eliminated because the organic acid in the mounting solution is compatible with the pressure sensitive adhesive. In the preferred embodiment, a sodium salt of polyacrylic acid is compatible with the acrylic based pressure sensitive adhesive. In its broadest aspects, this invention relates to the use of a mounting solution in a window film application environment, wherein the mounting fluid is compatible with the pressure sensitive adhesive which is used to secure the window film to a substrate. In other words, the mounting solution does not degrade the pressure sensitive adhesive in such a manner as to cause haze at the interface of the window film and substrate to which it is attached or to weaken the bond between the two.

DESCRIPTION OF THE PREFERRED EMBODIMENT

In accordance with the above discussion, this invention is concerned with a process for controlling window film haze in retrofitting applications. Window films have been retrofitted for over thirty years and have become very popular in the last decade. These films are generally polymeric films which are bonded to the window pane with an adhesive. During retrofitting of the window film, the degradation of the adhesive causes optical problems and particular the formation of haze. The most commonly used adhesives in the application of window film are pressure sensitive adhesives. Further the most commonly used pressure sensitive adhesives are acrylic based.

In prior art retrofitting procedures and in the subject invention, the seven step mounting procedure as described above is utilized. In the prior art during the extended drying process, the various components of the mounting solution have a tendency to react with the pressure sensitive adhesive causing this adhesive to become multi-phases. These multi-phases have different refractive indexes, thereby causing haze as a result of light scattering.

The problem of haze formation is particularly acute with window films which incorporate a metallic layer. The use of metallic layers is very common in window films which are used to reflect radiation. These metallic films hinder the permeation of the excess moisture through to the atmosphere.

As is briefly discussed above, prior art mounting solutions consist of water to which has been added a small amount of a suitable wetting agent such as a polyvinyl alcohol, sodium lauryl sulfate, sodium alkyl ethoxylate sulfate, ethanol, a non-ionic surfactant, dish washing detergent or baby shampoo. These wetting agents allow the mounting solution to wet out the substrate and generally assist in the placement of the film on the substrate by lubricating the substrate. Problems as discussed above occur when the mounting solution reacts with the pressure sensitive adhesive which is used to secure the film to the substrate. This invention is concerned with a new mounting solution and hence a new mounting process.

Polyorganic acid salts for use in accordance with the subject invention are illustrated in accordance with Formulas 1, 2 and 3 below. In the broad sense, organic salts of copolymers in accordance with Formula 1 may be used in the process of this invention.

  FORMULA 1

Wherein $R_1$, $R_2$, $R_3$, $R_4$, $R_5$, $R_6$ can be hydrogen or aliphatic chain having from 1 to 10 carbon atoms;

R' is a member selected form the group consisting of —$CONH_2$, —COOH, —OH, —$CH_2OCH_3$, —$CONHCH_2OH$, —$COOH_2OH$, —$COOCH_2CH_2OH$, pyrrolidone, pyridine, benzenesulfonic acid and their salts;

M is a metal ion selected from the group consisting of sodium, potassium, lithium, magnesium, calcium or hydrogen;

n is an integer which will result in a polymerized molecular weight of the poly acid salt from 470 to about 40,000;

the degree of neutralization of the acid by the metal ion is from 0 to about 100 percent; o is an integer of from 1 to 550 and p is an integer of from 0 to 549.

A more preferred copolymer for use in this invention consists of an aqueous solution of a metal salt of a polyacrylic acid having the following formula:

  FORMULA 2

Wherein $R_3$ is methyl or hydrogen;

Wherein $R_4$, $R_5$, $R_6$, and R' are the same as listed above relative to Formula 1

M is an alkali metal ion selective from the group consisting of sodium, potassium, and lithium;

n is an integer which will result in a polymerized acrylic acid salt having a molecular weight from about 3,700 to about 20,000;

the degree of neutralization by the metal ion is from about 70 to 100 percent;

o is an integer from 1 to 10; and p is an integer from 0 to 10.

A most preferred polymer for use in this invention consists of an aqueous solution of a sodium salt of a polyacrylic acid molecule having the following formula:

  FORMULA 3

Wherein n is an integer which will result in a polymerized acrylic acid salt molecule having a molecular weight of from 4,000 to about 6,000 with a preferred molecular weight being about 5,100; and the degree of neutralization by the sodium ion is 100 percent.

The preferred polyacrylic acid sodium salt or copolymers as described above may be synthesized in different ways. The polymerization can be carried out in solution, and potassium salts thereof and other hydrophilic/hydrophobic monomers. The initiators may be hydrophobic or hydrophilic, examples of suitable initiators are benzoyl peroxide, 2,2' azobisisobutyronitrile, and potassium persulfate. The preferred reaction temperature is between 40° C. to 90° C. A chain transfer agent such as n-butyl thiol can be used to control molecular weight. The most effective molecular weight is about 5,100, which is small enough to allow a resulting solution to be sprayed and large enough to be compatible with acrylic based polymer resin systems. The preferred mounting solution in accordance with this invention is a solution of the sodium polyacrylic acid as described above in connection with Formula 3.

As has been previously mentioned, solutions of compositions as being represented by Formula 1, 2 and 3 are used as mounting solutions in accordance with this invention. The broad concentration range for solutions of Formulas 1, 2 and 3 to function as mounting solutions is from about 1 to about 33 weight percent of a polyacrylic salt is dissolved in a suitable solvent. A more preferred range is from about 1 to about 6 weight percent, and the most preferred concentration is 2 to 4 weight percent based on clarity and cost efficiency. The preferred mounting solution for use in this invention is a 2 to 4% aqueous solution of the acid salt of Formula 3 with a most preferred concentration being 2%. These solutions are clear and have densities of 1.0117–1.0320 g/ml.

The mounting solution of this invention will not affect common additives which are present in the films being mounted such as UV stabilizers, pigments/dyes, antioxidants, and corrosion inhibitors. The subject mounting solution has excellent compatibility with pressure sensitive adhesives, especially, acrylic based pressure sensitive adhesive. That is, the components of the mounting solution do not affect the pressure sensitive adhesive component of a window film. This is the reason why the mounting solutions of this invention do not generate haze in comparison to the prior art mounting solutions. In addition, mounting solutions of this invention improve the bonding strength between the window film and the substrate to which it is applied.

Due to the compatibility of the mounting solution of this invention, with the adhesive, permeation of the excess moisture through the composite film is facilitated and hence, the formation of haze is prevented.

In accordance with this invention, a metal salt of a polymeric acid in accordance with Formula 1 and 2 above is dissolved in a suitable solvent to form a mounting solution. In accordance with the preferred embodiment, a mounting solution is prepared by dissolving a solid polyacrylic acid sodium salt of Formula 3 in water.

The preferred solvent for use in accordance with this invention is water, a most preferred solvent is deionized water. Other solvents which may be used are methyl alcohol, ethyl alcohol, isopropyl alcohol, acetone, methyl ethyl ketone, mixtures thereof, and water solutions thereof and tap water.

Mixing is effected at the room temperature. Higher temperatures can accelerate the solution process. The polyacrylic acid sodium salt of Formula 3 is totally soluble in water at 2–10% level, and at these concentrations produce satisfactory mounting solutions. Conversely, lower concentrations may permit haze formation.

FIG. 3 shows that mounting solutions in accordance with Formula 3 produce excellent haze level results when the concentration of the polyacrylic acid is between 1% and 10 weight percent.

Figure 4:
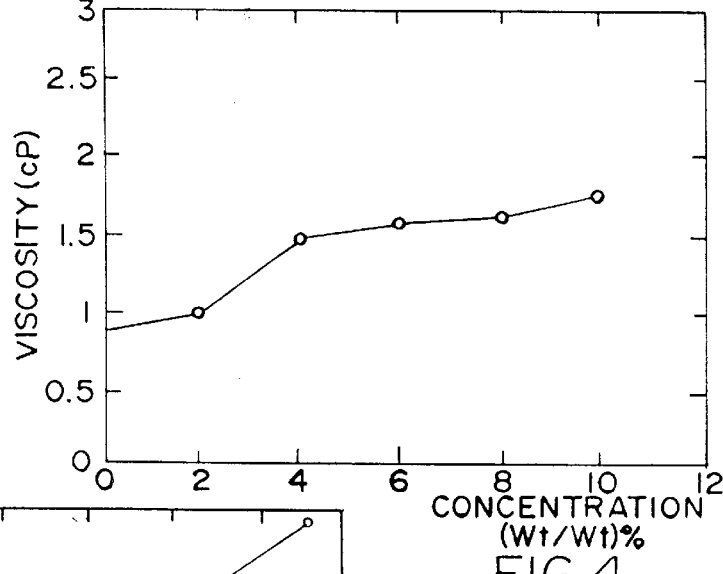
FIG. 4 is a graph showing the relationship between the concentration of polyacrylic acid sodium salt solutions and the resulting viscosities of the mounting solutions at 24.5° C.

FIG. 4 shows that the increase in viscosity between one and two percent solutions is minimal, and that the viscosity of solutions tends to level off between four and ten percent. Solutions which have a viscosity of less than two percent function as satisfactory mounting solutions in accordance with this invention.

Figure 5:
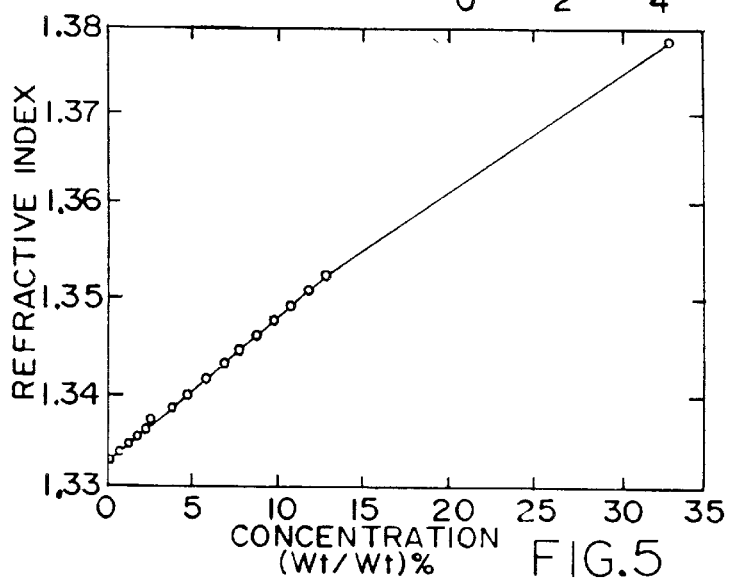
FIG. 5 is a graph showing the relationship between the concentration of polyacrylic acid sodium salt solutions at different concentrations and the resulting refractive indexes of these mounting solutions at 24.5° C.

The refractive indexes of various concentrations of polyacrylic acid sodium salt solutions at 24.5° C. is shown in FIG. 5. A 2 percent mounting solution has a refractive index of 1.3329. Deionized water has a refractive index of 1.3322. Pressure sensitive adhesives commonly used with window films have a refractive index of about 1.46. The data of FIG. 5 shows that polyacrylic acid sodium salt solution has a refractive index close to that of pressure sensitive adhesive. Therefore, as the excess water of the mounting solution evaporates, the refractive index of polyacrylic acid sodium salt becomes even closer to that of the adhesive. Hence, light scattering or haze is minimized.

In addition to resulting in a haze free application, use of the mounting solutions of this invention results in a stronger bond between the window film and the substrate when compared to the prior art.

The use of the mounting solution of this invention increases peel strength up to 13% after QUV (weatherability) test for 2,000 hours and up to 18% and above after dried at ambient temperature for 6 months again when compared to prior art mounting solutions.

EXAMPLES

The present invention is illustrated by the following Examples which are not to be constructed as limiting the invention to their details.

Window film mounting solutions were prepared in accordance with the below listed Examples. The dry lamination process (no mounting solution was applied) was used to mount a standard control window film on to a control substrate. The resulting composite structure was then tested for haze formation and bonding strength. The data for Examples 1 to 40 is set forth in Table 1 below. For example, air has a haze number of 0.37%, and the standard glass pane has a haze number of 0.53%. The haze number of a sample was calculated by subtracting the air haze number from the measured haze number for the sample in question. As a standard for clarity, a haze number of 0.80% was considered clear.

The window film of FIG. 2 was used in Examples 1 to 40. Film 2 consisted of a multilayered sputtered polyester film having a thickness of 8 mils, Film 2 comprises a base polyester film layer 4 to which is laminated a secondary film 6 via a laminating adhesive layer 5. Film 2 incorporates a metalized layer which comprises multiple layers of different metals which have been vacuum deposited onto a secondary base film 7. Film 2 was chosen because it incorporates multiple layers of metals which make moisture permeation through this metal layer very difficult. It is felt that if the process and composition of this invention works for film 2 as shown in FIG. 2 it will work for other films with less complex metalized layers. The composite film 2 as used in Examples 1 to 40, was manufactured by Film Technologies International, Inc. Secondary film 6 is a metalized layer that incorporates the multiple layers of different metals. Films such as secondary film 6 are sold by Southwall Technology, Inc., 1029 Corporation Way of Palo Alto, Calif., under the trademark SOLIS and are generally described in U.S. Pat. Nos. 4,799,745, 4,861,680.

The side of polyester film 2 which is to be adhered to the glass substrate is coated with a 0.5 mil coating 8 of an acrylic based pressure sensitive adhesive. The use of pressure sensitive adhesives in this manner is well known in the prior art. 10 is a release film which prevents the premature sticking of adhesive coating 8. Release film 10 is peeled off prior to usage. Suitable pressure sensitive adhesives are manufactured by Solutia Company, 800 North Lindberg Boulevard, St. Louis, Miss., National Starch & Chemical Company, 10 Finderne Avenue, Bridgewater, N.J., and Ashland Chemical Company, in Columbus, Ohio under the respective trademarks GELVA, DURO-TACK and AROSET. The glass substrate used in the Examples consisted of a sheet of standard window glass of ¼ inches thickness as sold by City Glass & Mirror, St. Petersburg, Fla. The prior art mounting solution used in the Examples is manufactured and sold under the trademark ULTRO BOND by the assignee of this application and is an aqueous solution of sodium lauryl sulfate.

The samples were prepared in accordance with the following test protocol.
1. A glass sample measuring 4×10 inches was cleaned by scrubbing the surface with a swab saturated with a dish washing detergent solution for 30 seconds and then rinsed with tap water.
2. The mounting solution being tested was then sprayed onto the prepared glass sample.
3. The excess mounting solution was then carded off the prepared glass sample.
4. A sample of the film as shown in FIG. 2 measuring 3½×9 inches with its silicone liner 10 removed was sprayed with the mounting solution being tested, and then positioned on the center of the glass sample.
5. The sample was then squeezed using a standard film mounting squeegee for a period of 30 seconds to remove all excess mounting fluid.

6. The prepared sample was then air dried for the period specified in each of Examples 1 to 40

When weatherability tests were conducted, the samples were air dried for 10 days before weatherability tests were conducted at 82° C. in a standard QUV testing chamber as manufactured by the Q Panel Company, 26200 First Street, Cleveland, Ohio under UV light exposure for 2,000 hrs.

After preparation as per steps 1–6 set forth above, the samples were tested for clarity (the lack of haze) after 24 hours in accordance with ASTM test method D1003. The test measurements were conducted on a CS-5 Chroma Sensor manufactured by Datacolor International, Inc., of 5 Princess Road, Lawrenceville, N.J., and an average based on four readings was recorded.

The bonding strength of the film to the glass substrate was measured on samples prepared in accordance with steps 1 to 6 as set forth above in accordance with ASTM test method D3330. The equipment used was Slip/Peel Tester Model No. SP-101B as manufactured by Instrumentors, Inc. of 22077 Drake Road, Strongsville, Ohio.

The mounting solutions used in the below set forth Examples were prepared by dissolving the defined reagent in deionized water. After adding the reagent to the deionized water at 25° C., the solution was prepared by mixing with a magnetic mixer for 20 minutes.

After preparation, the viscosity of the mounting solution was measured on a Brookfield Viscometer, model DE30452, manufactured by Brookfield Englabs, Inc., of Stroughton, Mass. The viscometer was standardized against tap water with reference to Perry's Chemical Engineer's Handbook.

When specified the refractive indexes of the polyacrylic acid sodium salt solutions were measured at room temperature with an Abbe Refractometer, Model 1T, manufactured by Atago Co., Ltd. Of 32-10 Honcho, Itabasi-Ko, Tokyo, Japan.

The data for Examples 1 through 40 is shown in Table 1.

TABLE 1

| No. | Reagent name | Solvent | Wt % | Haze % | Mw | Drying time (h) | Drying temp. (F.) | Bond g/in | Weather ability test time (h) | Weather ability test temp. (F.) | Comment |
|---|---|---|---|---|---|---|---|---|---|---|---|
| 1 | Dry lamination | None | | 0.80 | | 24 | 75 | | | | Control |
| 2 | Ultra bond | water | 3.0 | 4.93 | | 24 | 75 | | | | Prior art |
| 3 | None | water | | 3.88 | | 24 | 75 | | | | |
| 4 | Polyacrylic acid sodium salt | water | 0.5 | 3.08 | 5100 | 24 | 75 | | | | Reagent is from Aldrich Chemical Company Inc. |
| 5 | Polyacrylic acid sodium salt | Water | 1.0 | 2.18 | 5100 | 24 | 75 | | | | Reagent is from Aldrich Chemical Company Inc. |
| 6 | Polyacrylic acid sodium salt | Water | 1.5 | 1.67 | 5100 | 24 | 75 | | | | Reagent is from Aldrich Chemical Company Inc. |
| 7 | Polyacrylic acid sodium salt | " | 2.0 | 1.58 | 5100 | 24 | 75 | | | | Reagent is from Aldrich Chemical Company Inc. |
| 8 | Polyacrylic acid sodium salt | Water | 2.5 | 1.37 | 5100 | 24 | 75 | | | | Reagent is from Aldrich Chemical Company Inc. |
| 9 | Polyacrylic acid sodium salt | Water | 3.0 | 1.46 | 5100 | 24 | 75 | | | | Reagent is from Aldrich Chemical Company Inc. |
| 10 | Polyacrylic acid sodium salt | Water | 4.0 | 1.43 | 5100 | 24 | 75 | | | | Reagent is from Aldrich Chemical Company Inc. |
| 11 | Polyacrylic acid sodium salt | Water | 6.0 | 1.02 | 5100 | 24 | 75 | | | | Reagent is from Aldrich Chemical |

TABLE 1-continued

| No. | Reagent name | Solvent | Wt % | Haze % | Mw | Drying time (h) | Drying temp. (F.) | Bond g/in | Weather ability test time (h) | Weather ability test temp. (F.) | Comment |
|---|---|---|---|---|---|---|---|---|---|---|---|
| 12 | Polyacrylic acid sodium salt | Water | 8.0 | 1.39 | 5100 | 24 | 75 | | | | Company Inc. Reagent is from Aldrich Chemical Company Inc. |
| 13 | Polyacrylic acid sodium salt | Water | 10.0 | 2.87 | 5100 | 24 | 75 | | | | Reagent is from Aldrich Chemical Company Inc. |
| 14 | Polyacrylic acid sodium salt | Water | 12.0 | 1.60 | 5100 | 24 | 75 | | | | Reagent is from Aldrich Chemical Company Inc. |
| 15 | Polyacrylic acid sodium salt | Water | 13.0 | 1.58 | 5100 | 24 | 75 | | | | Reagent is from Aldrich Chemical Company Inc. |
| 16 | Polyacrylic acid sodium salt | Water | 33.0 | 2.83 | 5100 | 24 | 75 | | | | Reagent is from Aldrich Chemical Company Inc. |
| 17 | Synthesized polyacrylic acid sodium salt | Water | 2.0 | 1.58 | | 24 | 75 | | | | Mw is estimated above 10,000 from viscosity |
| 18 | Dry lamination | None | | 0.78 | | 3072 | 75 | 2176 | | | Control |
| 19 | Polyacrylic acid sodium salt | Water | 2.0 | 0.54 | 5100 | 3072 | 75 | 2524 | | | Reagent is from Aldrich Chemical Company Inc. |
| 20 | Ultra bond | Water | 3.0 | 0.82 | | 7660 | 75 | 724 | | | Prior art |
| 21 | Polyacrylic acid sodium salt | water | 2 | | 5100 | 144 | 75 | 345 | | | Reagent is from Aldrich Chemical Company Inc. |
| 22 | Polyacrylic acid sodium salt | water | 2 | | 5100 | 144 | 75 | 452 | | | Reagent is from Aldrich Chemical Company Inc. |
| 23 | Polyacrylic acid sodium salt | water | 2 | | 5100 | 144 | 75 | 482 | | | Reagent is from Aldrich Chemical Company Inc. |
| 24 | Polyacrylic acid sodium salt | Water | 2 | | 5100 | 144 | 75 | 396 | | | Reagent is from Aldrich Chemical Company Inc. |
| 25 | Polyacrylic acid sodium salt | Water | 2 | | 5100 | 144 | 75 | 439 | | | Reagent is from Aldrich |

TABLE 1-continued

| No. | Reagent name | Solvent | Wt % | Haze % | Mw | Drying time (h) | Drying temp. (F.) | Bond g/in | Weather ability test time (h) | Weather ability test temp. (F.) | Comment |
|---|---|---|---|---|---|---|---|---|---|---|---|
| | | | | | | | | | | | Chemical Company Inc. |
| 26 | Ultra bond | Water | 3 | | | 144 | 75 | 22 | | | Prior art |
| 27 | " | Water | 3 | | | 144 | 75 | 9 | | | " |
| 28 | " | Water | 3 | | | 144 | 75 | 8 | | | " |
| 29 | " | Water | 3 | | | 144 | 75 | 20 | | | " |
| 30 | Synthesized polyacrylic acid sodium salt | Water | 5 | 0.97 | | 7248 | 75 | | | | Mw is estimated above 10,000 from viscosity |
| 31 | Synthesized polyacrylic acid sodium salt | Water | 10 | 0.82 | | 7248 | 75 | | | | Mw is estimated above 10,000 from viscosity |
| 32 | Polyvinyl pyrrolidone; Trade name is Kollidon 90 | Water | 2.0 | 0.81 | 1,200,000 | 7248 | 75 | | | | Reagent is from BASF Corp. |
| 33 | Ultra bond | Water | 3 | | | 240 | 75 | 2331 | 500 | 180 | Prior art |
| 34 | " | Water | 3 | | | 240 | 75 | 2013 | 1000 | 180 | " |
| 35 | " | Water | 3 | | | 240 | 75 | 2131 | 1500 | 180 | " |
| 36 | " | Water | 3 | | | 240 | 75 | 2104 | 2000 | 180 | " |
| 37 | Polyacrylic acid sodium salt | Water | 2 | | 5100 | 240 | 75 | 2526 | 500 | 180 | Reagent is from Aldrich Chemical Company Inc. |
| 38 | Polyacrylic acid sodium salt | Water | 2 | | 5100 | 240 | 75 | 2222 | 1000 | 180 | Reagent is from Aldrich Chemical Company Inc. |
| 39 | Polyacrylic acid sodium salt | Water | 2 | | 5100 | 240 | 75 | 2345 | 1500 | 180 | Reagent is from Aldrich Chemical Company Inc. |
| 40 | Polyacrylic acid sodium salt | Water | 2 | | 5100 | 240 | 75 | 2336 | 2000 | 180 | Reagent is from Aldrich Chemical Company Inc. |

DISCUSSION OF EXAMPLES

The Examples demonstrate that the level of haze is reduced when the mounting solution of this invention is used in comparison to prior art mounting solutions.

In particular, Example 4 demonstrates that when the concentration of a polyacrylic acid sodium salt is relatively low, the haze level in the resulting application is still relatively high.

Examples 5 through 16 demonstrate that concentration of a polyacrylic acid sodium salt can be varied from 1 to 33 percent and that the subject mounting solutions are effective in reducing haze. More particularly, Examples 5 to 10 show that haze levels can be reduced in a cost effective manner.

Examples 18 and 19 demonstrate that the bond strength after an extended drying period is significantly better using the mounting solution of the subject invention even when compared to the dry lamination control of Example 18.

Examples 21 to 25 demonstrate that the bond strength of the mounting solution of the subject invention is significantly higher than the prior art mounting solutions which are the subject matter of Examples 26 to 29.

Example 32 demonstrates the use of other than acrylic based reagents.

Examples 33 to 36, when compared to Examples 37 to 40, demonstrate that after a drying period of 240 hours., an exposure to a weatherability test, the bond strength achieved by using the mounting solutions of this invention are significantly higher than the bond strength of the prior art solutions which are the subject matter of Examples 33 to 36.

In summary, the data of Examples 1 through 40 demonstrate that by use of the mounting solutions of the subject invention, greater bond strength is achieved and the haze level is significantly reduced as is compared to the prior art.

The foregoing constitutes a description of various features of a preferred embodiment. Many changes to the preferred embodiment are possible without departing from the spirit and scope of the invention. Therefore, the scope of this invention should be determined with reference not to the preferred embodiments but to the following claims.

What is claimed is:

1. A process for retrofitting film, which incorporates a pressure sensitive adhesive, to a substrate which comprises the steps of:
   a. applying to either or both the film and substrate a mounting solution of a polymerized low molecular weight organic acid salt having the following formula:

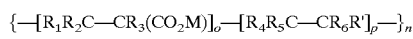

where $R_1R_2R_3R_4R_5R_6$ can be hydrogen or aliphatic chain having from 1–10 carbon atoms,
   R' is a member selected from the group consisting of $-CONH_2$, $-COOH-OH$, $-CH_2OCH_3$, $-CONHCH_2OH$, $-COOCH_2OH$, $-COOCH_2CH_2OH-$, pyrrolidone, pyridine, benzenesulfonic acid and their salts,
   M is a cation selected from the group consisting of sodium, potassium, lithium, magnesium, calcium or hydrogen.
   n is an integer which will result in a polymerized molecular weight of the poly acid salt of from 470 to 40,000,
   the degree of neutralization by the cation is from 1 to 100 percent
   and o is an integer of from 1 to 550, and p is an integer of from 0 to 549,
   b. applying the window film to the substrate.

2. The process of claim 1 wherein the acid salt of a polymeric low molecular weight organic acid has the following formula:

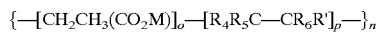

wherein $R_3$ is methyl or hydrogen
   wherein $R_4R_5R_6$ can be hydrogen or aliphatic chain having from 1 to 10 carbon atoms,
   R' is a member selected from the group consisting of $-CONH_2-COOH$, $-OH$, $-CH_2OCH_3$, $-CONHCH_2OH$, $-COOH_2OH$, $-COOH_2CH_2OH-$, pyrrolidone, pyridine, benzenesulfonic acid and their salts,
   M is an alkali metal ion selected from the group consisting of sodium, potassium or lithium,
   n is an integer which will result in a polymerized acrylic acid having a molecular weight from 3,700 to 20,000,
   the degree of neutralization is from 70 to 100 percent,
   o is an integer from 1 to 10, and
   p is an integer from 0 to 10.

3. The process of claim 1 wherein the polymerized low molecular weight organic acid salt has the following formula.

wherein n is an integer which will result in a molecular weight of from 4,000 to 6,000.

4. The process of claim 1 wherein the polymerized low molecular weight organic acid salt has a molecular weight of from 3,700 to 20,000.

5. The process of claim 2 wherein the low molecular weight organic acid salt has a molecular weight of from 4,000 to 10,000.

6. The process of claim 3 wherein the low molecular weight organic acid salt has a molecular weight of from 4,500 to 5,500.

7. The process of claim 3 wherein the low molecular weight organic acid has a molecular weight of 5100.

8. The process of claim 1 wherein the solvent of the solution is a member selected from the group consisting of water, methyl alcohol, ethyl alcohol, isopropyl alcohol, acetone, methyl ethyl ketone, mixture thereof and water solutions thereof, and the concentration of the low molecular weight organic acid salt is from 1 to 33 weight percent.

9. The process of claim 2 wherein the solvent of the solution is a member selected from the group consisting of water, methyl alcohol, ethyl alcohol, isopropyl alcohol, acetone, methyl ethyl ketone, mixtures thereof and water solutions thereof, and the concentrations of the low molecular weight organic acid salt is from 2 to 6 weight percent.

10. The process of claim 3 wherein the solvent of the solution is a member selected from the group consisting of water, methyl alcohol, ethyl alcohol and water solutions thereof, and the concentration of the low molecular weight organic acid salt is from 2 to 4 weight percent.

11. The process of claim 1 wherein the solvent of the solution is water and the concentration of the organic acid salt is from 1 to 22 weight percent.

12. The process of claim 2 wherein the solvent of the solution is water and the concentration of the organic acid salt is from 2 to 6 weight percent.

13. The process of claim 3 wherein the solvent of the solution is water and the concentration of the organic acid salt is from 2 to 4 weight percent.

14. The process of claim 4 wherein the solvent of the solution is water and the concentration of the organic acid salt is from 1 to 33 weight percent.

15. The process of claim 5 wherein the solvent of the solution is water and the concentration of the organic acid salt is from 2 to 6 weight percent.

16. The process of claim 6 wherein the solvent of the solution is water and the concentration of the organic acid is from 2 to 4 weight percent.

17. The process of claim 7 wherein the solvent of the solution is water and the concentration of the organic acid salt is from 2 to 4 weight percent.

18. The process of claim 8 wherein the solvent of the solution is water and the concentration of the organic acid salt is 2 weight percent.

19. The process of claim 9 wherein the solvent of the solution is water and the concentration of the organic acid salt is 2 weight percent.

20. The process of claim 10 wherein the solvent of the solution is water and the concentration of the organic acid salt is 2 weight percent.

* * * * *